United States Patent
Buchmuller et al.

(10) Patent No.: US 12,313,107 B2
(45) Date of Patent: May 27, 2025

(54) NOZZLE SYSTEM FOR A TEXTILE MACHINE, SCREW SYSTEM FOR A QUICK FASTENING SYSTEM, AND TEXTILE MACHINE COMPRISING SAID NOZZLE SYSTEM

(71) Applicant: Heberlein Technology AG, Wattwil (CH)

(72) Inventors: Patrick Buchmuller, Krummenau (CH); Peter Forrer, Wattwil (CH); Fabian Legenstein, Zurich (CH); Andreas Brunner, Wuppenau (CH)

(73) Assignee: Heberlein Technology AG, Wattwil (CH)

( * ) Notice: Subject to any disclaimer, the term of this patent is extended or adjusted under 35 U.S.C. 154(b) by 637 days.

(21) Appl. No.: 17/619,867

(22) PCT Filed: Jun. 19, 2019

(86) PCT No.: PCT/EP2019/066250
§ 371 (c)(1),
(2) Date: Dec. 16, 2021

(87) PCT Pub. No.: WO2020/253958
PCT Pub. Date: Dec. 24, 2020

(65) Prior Publication Data
US 2022/0356039 A1    Nov. 10, 2022

(51) Int. Cl.
*F16B 21/04* (2006.01)
*B05B 15/60* (2018.01)

(52) U.S. Cl.
CPC .............. *F16B 21/04* (2013.01); *B05B 15/60* (2018.02)

(58) Field of Classification Search
CPC ................................. F16B 21/04; B05B 15/60
See application file for complete search history.

(56) References Cited

U.S. PATENT DOCUMENTS 2,549,793 A      4/1951  Francesco
6,969,016 B2 *  11/2005  Kusama .................. B05B 15/65
                                                        285/376

(Continued)

FOREIGN PATENT DOCUMENTS

EP      0385125 A1   9/1990
EP      1262619 A2   4/2002

(Continued)

OTHER PUBLICATIONS

International Search Report for International Application No. PCT/EP2019/066250 mailed Mar. 24, 2020, 2 pages.

(Continued)

*Primary Examiner* — Anita M King
(74) *Attorney, Agent, or Firm* — Finch & Maloney PLLC (57) ABSTRACT

A nozzle system for a textile machine comprising at least one nozzle element and a connecting element for connecting the nozzle element to a textile machine. The connecting element comprises at least one quick fastening system. The quick fastening system comprises a first and a second position. In the first position the quick fastening system is connected to the connecting element so that the nozzle element can be fastened to the quick fastening system in such a way that the nozzle element can be removed without auxiliary devices. The quick fastening system is designed in such a way that in the second position the nozzle element is immovably fastened to the connecting element.

15 Claims, 8 Drawing Sheets

(56) References Cited

U.S. PATENT DOCUMENTS

2011/0027038 A1    2/2011  Hsu et al.
2018/0051735 A1*  2/2018  Stenyakin ............... F16B 21/09
2021/0156052 A1*  5/2021  Kappeler ................ D01H 5/66

FOREIGN PATENT DOCUMENTS

EP        2 420 466 A2    2/2012
WO      2020253958 A1   12/2020

OTHER PUBLICATIONS

Written Opinion of the International Searching Authority for International Application No. PCT/EP2019/066250 mailed Mar. 24, 2020, 3 pages.

* cited by examiner

NOZZLE SYSTEM FOR A TEXTILE MACHINE, SCREW SYSTEM FOR A QUICK FASTENING SYSTEM, AND TEXTILE MACHINE COMPRISING SAID NOZZLE SYSTEM

The invention relates to a nozzle system for a textile machine, a screw system for a quick fastening system and a textile machine with nozzle system.

Various nozzle systems are known from the prior art. Nozzle systems are usually used to divert, accelerate or precisely apply fluids. By fluids are meant both gases and liquids. Nozzle systems are used in textile machines, among other things. Textile machines usually comprise several nozzle systems for treating yarns. For maintenance or replacement of the nozzles, they have to be dismantled. To do this, the screws with which the nozzles are usually fastened must be loosened.

EP 2 420 466 discloses such a nozzle system in which the nozzle is fixed with several screw bolts.

These known nozzle systems have the disadvantage that assembly and disassembly require many steps and thus a lot of time. Furthermore, there is a risk that the nozzle systems or the fastening means of the nozzle systems may fall down and thus be damaged.

It is the object of the invention to remedy these and other disadvantages of the prior art. In particular, a nozzle system is to be provided which can be fastened quickly, easily and securely.

These tasks are solved by a nozzle system for a textile machine, a screw system for a quick fastening system and a textile machine with a nozzle system according to the independent claims.

In particular, the task is solved by a nozzle system for a textile machine. The nozzle system comprises at least one nozzle element and a connecting element for connecting the nozzle element to a textile machine. The connecting element comprises at least one quick fastening system. The quick fastening system comprises a first position and a second position. In the first position, the quick fastening system is connected to the connecting element such that the nozzle element is attachable to the quick fastening system such that the nozzle element is removable without auxiliary means. The quick fastening system is designed in such a way that in the second position the nozzle element is immovably attached to the connecting element.

This enables secure fastening and yet simple, quick removal. Removable without auxiliary means is defined here as being able to move the nozzle element and remove it from the connecting element without having to move the quick fastening system or parts of the quick fastening system, such as loosening a screw or by using pliers, hammer, screwdriver or other tools. The quick fastening system may be fixed to the connecting element so that when the nozzle element is removed, this connection cannot be loosened and/or the screw system can be removed from the connecting element. The quick fastening system can be fixed, preferably clamped, in one or more openings. In this way, it can be ensured that the screw system does not fall off when the nozzle element is loosened. In the first position, the nozzle element may be retainable by a magnet and/or a spring element. The nozzle element may be held in the first position at two points and/or clamped in the second position at one or two locations.

Textile machines are generally understood to be machines for the industrial production of textiles, for example spinning machines, texturing machines, shedding machines and drawing machines.

These machines are all equipped with nozzles. Textile machines are used to treat all kinds of threads, yarns, cables or similar materials. These can be made of artificial fibres (plastics such as PE, PP, etc.). However, they can also consist of natural fibres (cotton, wool, raffia, etc.) or mixed fibres. Here, the term "yarn" is used for all these types of materials.

The connecting element may comprise fastening elements for fastening the nozzle system to a textile machine. The connecting element may comprise a base element, in particular a base plate. The connecting element may comprise yarn guiding elements and/or yarn clamping elements. The yarn guiding elements and/or yarn clamping elements may be arranged substantially perpendicular to a surface of the base element. The yarn guiding elements and/or yarn clamping elements may each be arranged at one end of the base element. The base element and the yarn guiding elements may be manufactured in one piece, i.e. in particular milled or cast as one piece from one material. Preferably, the nozzle element is arranged between the yarn guiding elements and/or yarn clamping elements. The quick fastening system may be arranged on a surface and/or on a side of the base element. However, it is also possible that the quick fastening system is attached to or is a part of the yarn guiding element and/or yarn clamping element. The connecting element may comprise a fastening means, in particular a thread, for fastening an air delivery system. The connecting element may comprise an alloy of aluminium, magnesium and silicon. The connecting element may comprise fastening openings for fastening the quick fastening system. The mounting apertures may comprise threads. The fastening apertures may be circumferentially open or closed. When the fastening apertures are circumferentially closed, cutting the thread does not create burrs at the edge of the fastening aperture.

The quick fastening system may comprise a rigid element, in particular a clamping element, and/or an actuatable device. The actuatable device may comprise a movable element, in particular a rotatable element. The movable element may in particular be rotatable by a maximum of 180°. The movable element may be displaceable. The actuatable device may comprise a movable element and an immovable element. The movable element may be displaceable and/or rotatable in the immovable element. The movable element can be designed in such a way that by moving the element, the nozzle element can be displaced, respectively a clamping effect can be achieved between the connecting element and the quick fastening system as well as between the movable and the rigid element of the quick fastening system. The quick fastening system can comprise two actuable devices. The advantage of combining the rigid element and the operable device is that only one connection needs to be released, making the replacement of the nozzle system easier and faster.

Preferably, the quick fastening system is designed in such a way that in one fastening position of the connecting element, the nozzle element can be prevented from falling down.

In a fastening position, the connecting element is arranged on a textile machine and the nozzle element is arranged at the side of the base element. In this fastening position, the quick fastening system or at least a part thereof is arranged in particular below the nozzle element, preferably in such a way that the nozzle element rests on an element of the screw system, preferably on the rigid element. In this position, the movable device can be arranged above the nozzle element. This makes it easy to prevent the nozzle element from falling down when the movable device is loosened.

Preferably, in the first position of the quick fastening system, the nozzle element is movably arranged between a first and a second position.

In the first position, the nozzle element may be displaceably arranged, in particular between two elements of the quick fastening system, i.e. away from a first element towards a second element. However, it is also possible that the nozzle element is arranged in the first position so as to be laterally displaceable and/or tiltable and/or pivotable.

Preferably, the at least one nozzle element comprises an adapter element. At least one nozzle is arranged on the adapter element.

The adapter element may comprise fastening elements and/or fastening sections and/or fastening incisions, in particular a substantially elongate incision and a shorter and at least at one open end wider incision. The elongate indentation may be substantially an elongate hole with an open end. The elongate indentation may be 7 mm deep. The elongate indentation may have a width of 4 mm with a tolerance of 0 to +0.075 mm. The closed end of the elongated incision may have a roundness of 2 mm. The edges of the elongate incision may be rounded, preferably with a radius of 3 mm. Preferably, the elongated indentation is configured to allow the nozzle element to slide along the yarn guiding direction in the first position of the quick fastening system.

Preferably, the quick fastening system attaches or can attach the at least one nozzle directly or via an intermediate adapter element to the adapter element and/or the adapter element to the connecting element.

In the first case, the quick fastening system is connected or connectable to the adapter element in the same way as the connection between the quick fastening system and the connecting element was described above.

According to the invention, the problem is further solved by a nozzle system, in particular as previously described. The connecting element comprises a seal for sealing an air delivery system.

The seal may be fixedly or releasably connected or connectable to the base element.

Preferably, the seal comprises a substantially conical shape. In particular, the inner surface comprises a constant radius towards the axis of the seal.

This conical shape is preferably arranged such that the wide side of the conical shape is arranged inside the connecting element. This makes it easy to prevent the seal from falling out of the connecting element. The seal is preferably made of plastic, in particular fluorocarbon rubber. The seal may have an oval cross-section and/or be arranged in the adapter element or in the intermediate adapter element, for example, if several nozzles are arranged on an intermediate adapter element or an adapter element.

Preferably, the connecting element comprises at least one recess for receiving a sleeve element of the quick-fix system.

The sleeve element may be configured as an immovable element of the actuatable device. The bulge may be designed to accommodate a fastening pin. Thus, the sleeve element may be fastened and/or fixable with a fastening pin.

The recess may comprise a substantially circular shape having a flattened side. The recess may comprise a round bulge, in particular adjacent the transition from the round shape to the flattened side.

The connecting element may comprise further substantially identical recesses, for example for receiving the rigid element.

Preferably, the nozzle element comprises at least one protective element for protecting the nozzle.

The protective element may be part of the adapter element. The protective element may be made of metal or a hard plastic. The protective element may be cast, stamped or milled.

Preferably, the protective element comprises an impact cage.

In particular, this is arranged to protect the sides of the nozzle that are not already protected by other elements of the nozzle system, such as the yarn guiding elements or the yarn clamping elements. Preferably, the impact cage comprises at least two side protection elements.

According to the invention, the problem is further solved by a screw system for a quick fastening system of a nozzle system, in particular a nozzle system as previously described. The screw system comprises a sleeve element for attachment to a first element and a pin for connection to a second element. The pin comprises at least one circumferentially arranged guide element. The sleeve element comprises a guide for guiding the guide element. The pin is arranged at least partially within the sleeve element so that the pin is rotatably and displaceably mounted relative to the sleeve element. The guide comprises a maximum of ¾ turn, in particular a maximum of ½ of a turn.

Such a screw system allows the connection between a first and a second element to be loosened by a small rotation. The sleeve element may thus be arranged in the connecting element, for example, and the pin may be designed to fix the nozzle element. Thus, the screw system may act as an operable device of the quick fastening system. Preferably, the quick fastening system is adapted to be fixedly connected to the first element and to be releasably connected and/or connectable to the second element. Preferably, the guide element and the guide are configured such that the support between the guide element and the guide is linear.

Preferably, the sleeve element is a maximum of 8.5 mm long and comprises a maximum diameter of 6 mm.

The tight space conditions of a nozzle system demand a fastening device that is as small as possible. However, in order for the nozzle element to provide sufficient support even under pressure, the quick fastening system must still be of a certain size.

Preferably, the guide comprises a diameter of 1.72 mm, in particular with a tolerance of +/−0.1 mm.

Maintaining a certain dimension of the guide is necessary to allow easy and safe release. Accordingly, the guide element is smaller, preferably at most 1.5 mm, in cross-sectional diameter.

Preferably, the sleeve element comprises a twist-locking element.

The sleeve element may have bulges, protrusions, indentations and/or other irregular contours as anti-rotation elements.

Preferably, the anti-rotation element comprises an anchoring portion. The anchoring portion comprises a cross-sectional surface having an outline. In particular, the outline comprises substantially a round side and a flattened side. The outline of the cross-sectional surface comprises an indentation. The indentation is in particular arranged at a transition from the flattened side to the round side. The radius of the indentation comprises in particular half the radius of the round side, preferably a radius of 1.4 mm.

Preferably, rounded side comprises a radius of 3 mm. In particular, the radius has a tolerance of 0.05 mm.

A precisely fitting production enables a secure fastening of the screw system.

Preferably, the flattened side of the outline to the centre of the rounded side comprises a distance of about 2.5 mm.

Preferably, the guide is designed in such a way that a stroke of the pin of at least 1.55 mm is possible.

It must be possible to lift the pin sufficiently to allow easy removal of the second element without auxiliary means.

The guide may at least partially comprise a pitch between 15°-45°, preferably 18 or 30°.

This ensures that the pin overcomes a sufficiently large distance with a small movement so that the second element, e.g. the nozzle element, can be easily removed while still being sufficiently secured against falling down.

Preferably, the guide is closed.

Thus, the guide does not have an opening on the circumference through which a guided element could be inserted into the guide.

Preferably, the guide comprises several sections, the sections being formed with or without a pitch.

The pitch of a first section may be different from the pitch of a second section. The sections without slope and the sections with slope may be arranged alternately.

Preferably, the transitions between the sections are rounded.

Thus, the guide does not comprise edges, preferably on the upper guide wall, which could hinder the guide element in movement. Furthermore, the guide does not comprise any constrictions, so that the guide element can be guided easily and quickly. The guide element may be cylindrical. In particular, the guide element may be arranged such that the part of the guide element arranged in the guide does not protrude beyond the sleeve element. In this way, snagging can be easily prevented.

Preferably, the guide comprises an engagement element. The engagement element is in particular arranged at one end of the guide, in particular preferably at a lower end of the guide in a connecting position of the sleeve element.

This allows the pin to be easily held in a first position. The guide element may comprise a spring element which allows an engagement position.

Preferably, the engagement element comprises a bulge of the guide. In particular, the bulge has a radius comprising substantially half the diameter of the guide, preferably a radius of 0.86 mm.

The precisely fitting manufacture enables a secure fastening of the guide element.

Preferably, the pin comprises a recess for receiving the guide element. In particular, the recess comprises a cross-sectional diameter of 1.5 mm, preferably with a tolerance of −0.014 to −0.034 mm.

This ensures a stable attachment of the guide element.

Preferably the pin comprises a height of 7.5 mm and in particular a cross-sectional diameter of 4 mm, preferably with a tolerance of −0.01 to −0.05 mm, whereby the inner cross-sectional diameter of the sleeve element is 4 mm with a tolerance between 0.1 mm and 0 mm.

This allows the adapter element to be well centred relative to the yarn guide by the yarn guide elements and the pin to slide quickly and smoothly out of the sleeve element and into the sleeve element.

Preferably, the pin comprises a head for clamping the second element. In particular, the head comprises a height of substantially 1.8 mm.

The pin must not protrude too far from the connecting element or adapter element, otherwise the yarn path into the nozzle element will be blocked.

Preferably, the head comprises a flattened side and a rounded side on the circumference. In particular, the flattened side is located at a maximum distance of 1.95 mm from the axis of rotation of the pin. In particular, the rounded side has a radius of 3.75 mm.

On the one hand, this ensures that the pin does not block access to other elements in the confined space. On the other hand, a corresponding counterpart can be easily clamped by turning the pin.

Preferably, at the transitions of the rounded side to the flattened side, at least one rounding section with a radius deviating from the radius of the rounded side, in particular a radius of 2 mm, is arranged.

This allows for a precisely fitting rotation.

Preferably, two rounding sections are arranged at each transition. A straight section, in particular at an angle of 45° to the straight side of the head, is arranged between each of the rounding sections.

Preferably, the screw system comprises a spring element. The spring element is arranged in the sleeve element in such a way that by moving the pin into the sleeve element, the spring element can be tensioned.

This allows a quick engagement, as the guide element can be directly connected to the engagement element by the spring pressure. The screw system can also comprise other reset mechanisms.

The problem is also solved by a quick fastening system for fastening a nozzle element of a textile machine. The quick fastening device may comprise at least one screw system as described above and a rigid element. The rigid element may comprise a clamping element, in particular a clamping bolt.

The clamping element may comprise a flattened side and a rounded side at the circumference. A recess may be arranged between the flattened side and the rounded side for arranging a fastening element such as a screw.

The clamping member may comprise a fastening portion and a clamping portion. In particular, the fastening portion may comprise a maximum cross-sectional diameter of 5.8 mm. The clamping portion may comprise a clamping element for clamping an element to be fastened, in particular a projection. The clamping portion may comprise a notch for locating an element to be fastened. The clamping member may comprise a height of 12.7 mm.

Preferably, the nozzle system as previously described comprises a quick fastening system comprising at least one screw system as previously described and in particular a clamping element.

Preferably, the screw system is designed to be changeable from the first fastening position to the second fastening position by rotating an element of the screw system less than 181°.

According to the invention, the problem is further solved by a textile machine comprising at least one nozzle system as previously described.

Preferably, the nozzle system is arranged and/or arrangeable on the textile machine such that the nozzle element is restricted in at least two directions of movement in the first position. Preferably, the nozzle element is arranged in such a way that the connection between the nozzle element and the connecting plate cannot be detached from the connecting element by compressed air or gravitational force, but the nozzle element can be removed from the connecting element by a user simply moving the nozzle element, preferably against the soldering direction and in particular tilting it. The nozzle system may be arranged such that a clamping element is arranged at the bottom in the plumb direction and a movable element or device is arranged at the top.

The problem is further solved by a nozzle element, in particular a nozzle element for a nozzle system as previously described. The nozzle element comprises an adapter element for connecting to a connecting element and a nozzle. The nozzle comprises two mould elements forming the nozzle channel and a cover. The nozzle is arranged on an upper side of the adapter element. The nozzle is connected to the adapter element via two screws, the screws being inserted from a lower side of the adapter element. The connection via the two screws is such that the mould elements are aligned with each other by the screws and centred on the adapter element.

In this way, a nozzle element can be manufactured easily and precisely, as additional centring pins can be omitted. The mould elements can be made of ceramic.

The task is also solved by a method for servicing a nozzle system, in particular a nozzle system as previously described, comprising the steps:
Providing a Nozzle System
   bringing a quick-fix system from a second position to a first position by rotating a pin through a maximum of 180°
   shifting a nozzle element from a first position to a second position by shifting vertically
   tilting the nozzle element
   removing the nozzle element and/or an adapter of the nozzle element from a connecting element.

An embodiment of a preferred nozzle element is exemplified with reference to the following figures.

They show:
FIG. 1 shows a perspective view of a nozzle system 100. The nozzle system 100 comprises a nozzle element 1 which is attached to a connecting element 2 by means of a quick fastening system 3.

Figure 1:
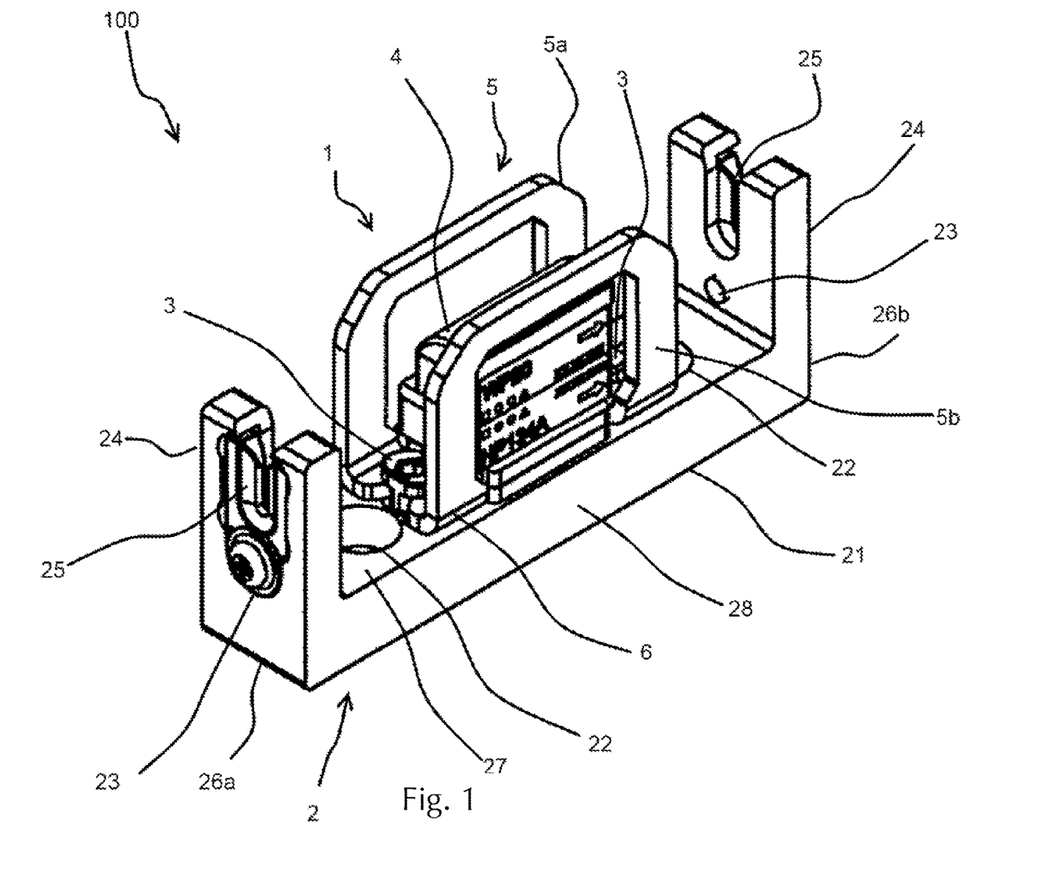
FIG. 1: Perspective view of a nozzle system

The nozzle element 1 comprises a nozzle 4, a protective element 5 with two side arms 5a and 5b forming an impact cage, and an adapter element 6. The protective element 5 and the adapter element 6 are manufactured in one piece, in this embodiment stamped as one part.

The connecting element 2 comprises a base element, in this case a base plate 21, in which two holes 22 are drilled. These are for connection to a textile machine. At each of the ends 26a, 26b of the base plate 21 a yarn guiding element 24 is arranged perpendicular to the base plate 21. The yarn guide elements 24 comprise yarn protection elements 25, each of which is fastened with a screw 23, in this case a pan-head screw. The yarn guide elements 24 are made in one piece with the base plate 21.

The nozzle element 1 is arranged between the yarn protection elements 24 and the holes 22 on the wide, here upper, surface 27 of the base plate 21. The yarn channel of the nozzle 4 is arranged laterally (not shown here).

Yarns are guided from the end 26a through a first yarn guiding element 24, over the quick fastening system 3 and into the nozzle 4, where they are treated. They are then guided out of the nozzle system 100 through the yarn guide element 24 again.

In the fastening position of the nozzle system 100, the end 26b shown in the picture on the right is arranged at the bottom, the top 27 and side surface 28 of the base plate 21 are arranged parallel to the perpendicular.

Figure 2:
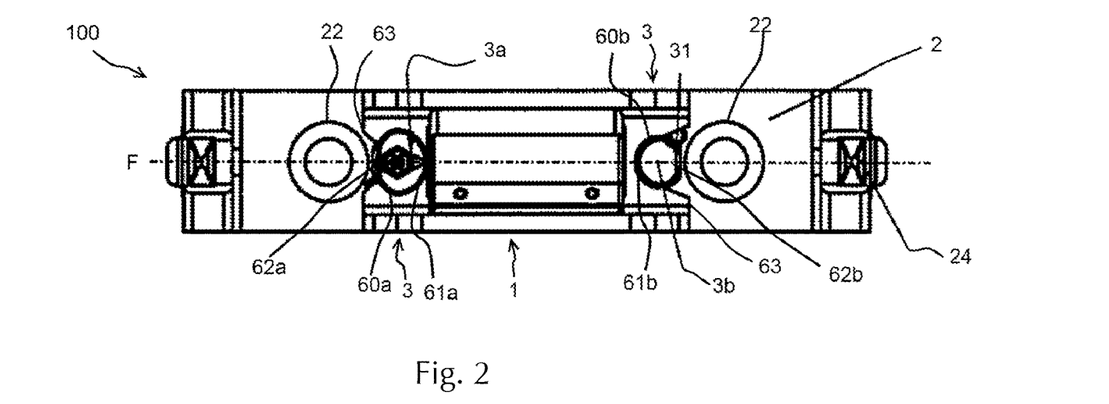
FIG. 2: Top view of the nozzle system from FIG. 1
FIG. 3: Cross-section through a screw system

Details of how to attach and detach the nozzle element 1 from the connecting element 2 are described in relation to FIG. 2.

FIG. 2 shows a top view of the nozzle system 100 from FIG. 1. The nozzle element 1 can be seen, which is attached to the connecting element 2 with the quick fastening system 3. The holes 22 are designed here as countersunk holes. The holes 22 are arranged directly adjacent to narrow sides 63 of the nozzle element 1. The quick fastening system 3 comprises a screw system 3a and a clamping element 3b. The clamping element 3b is firmly connected to the connecting element 2 by clamping the clamping element 3b with a fastening element 31 in an opening of the connecting element 2. The screw system 3a is fastened in the same way (not shown here). Both the screw system 3a and the clamping element 3b comprise a head 60a and 60b, each head 60a and 60b comprising a round clamping side 61a, 61b and a flattened side 62a and 62b. The flattened sides 62a and 62b are flattened to the extent that screws can be easily inserted into the holes 22. The rounded clamping sides 61a and 61b are designed so that the nozzle element 1 can be easily clamped (cf. FIGS. 5 and 7).

The figure shows the quick fastening system 3 in a second position. In this second position, the rounded side 61a of the head 60a of the screw system 3a is oriented in such a way that it presses the nozzle element 1 towards the clamping element 3b. As a result, the nozzle element 1 is firmly connected to the connecting element 2 and cannot be moved. When the quick fastening system 3 is released, the head 60a of the screw system 3a is brought into the first position, i.e. turned so far that the round clamping side 61a of the screw system 3a points away from the clamping element 3b. This releases the clamping connection between head 60a and nozzle element 1 and the nozzle element 1 can be moved along the thread guide line F. This is the first position of the quick fastening system 3. In this position the nozzle element 1 is held so far that it cannot fall down, even if there is still pressure on the nozzle.

Figure 3:
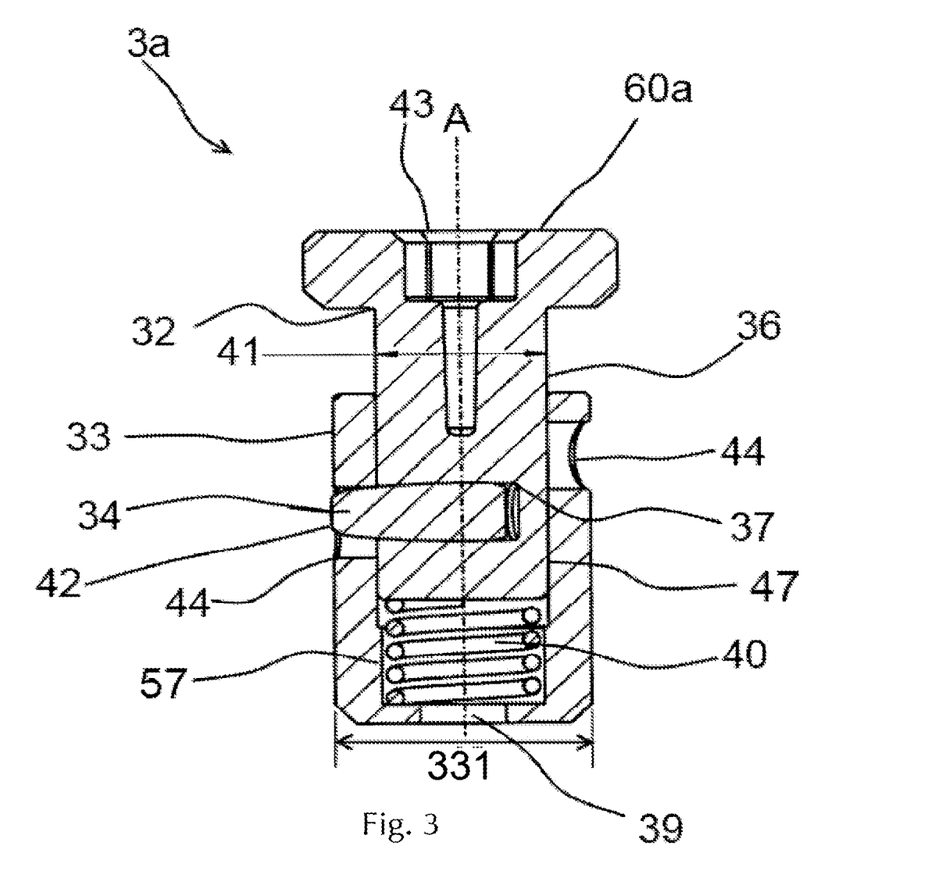

FIG. 3 shows a cross-section of a screw system 3a. The screw system 3a comprises a rigid element, here a sleeve element 33, a movable element, here a pin 32 and a guide element 34.

Figure 4:
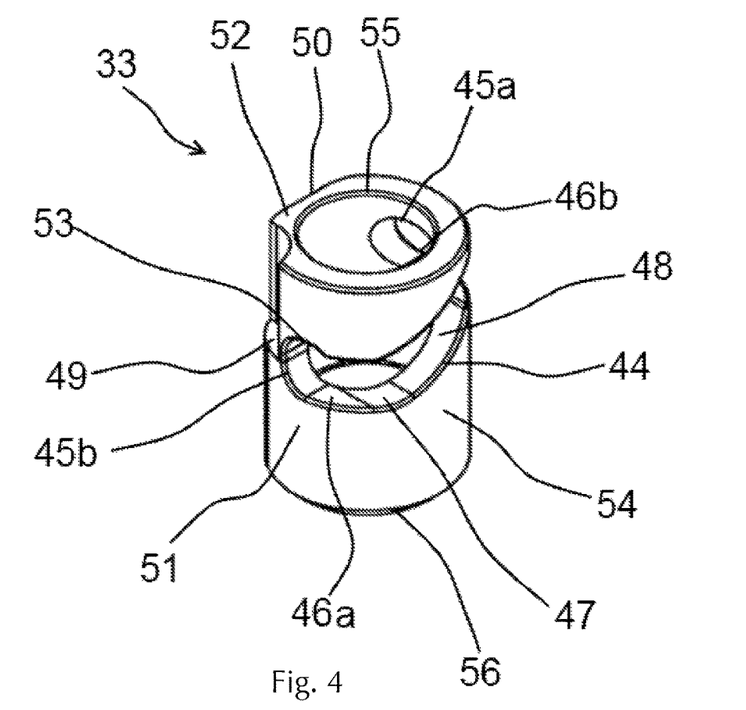
FIG. 4: Perspective view of a first embodiment of a sleeve element

The sleeve element 33 has an outer cross-sectional diameter 331 of 6 mm with a tolerance of 0 to −0.1 mm and a wall thickness of 4 mm with a tolerance of +/−0.05 mm on a flattened side 50 (cf. FIG. 4). Inside, the sleeve element 33 has a first interior space 47 and a second interior space 57. The first inner space 47 is arranged at the top and leads from an upper side 52 of the sleeve element 33 6 mm towards a lower side 56 of the sleeve element (cf. FIG. 4). The cross-sectional diameter of the first inner space 47 is 4 mm with a tolerance between +0.05 mm and 0 mm. The second inner space 57 is arranged below the first inner space 47 and leads from the first inner space 47 2 mm towards the lower side 56 (cf. FIG. 4). The second inner space has a cross-sectional diameter of 3.8 mm.

The guide element 34 is arranged to be guided in a guide 44 of the sleeve element 33. The guide element 34 is also arranged in a recess 37 in the shank 36 of the pin 32. The shaft 36 is partially arranged inside the sleeve element 33. A spring element 40 is arranged below the shaft 36 and above an opening 39 in the bottom of the sleeve element 33.

The shaft 36 comprises a cross-sectional diameter 41 of 4 mm with a tolerance of −0.1 mm to −0.5 mm. The recess 37 in the shaft 36 comprises a cross-sectional diameter of 1.5 mm with a tolerance of 0.014 to −0.034 and a depth of 3.3 mm.

The pin 32 also comprises the head 60*a* of the screw system 3*a* with a recess 43 for a hexagonal screwdriver.

The guide element 34 has a cylindrical shape. The guide element 34 is pressed into the recess 37 so that the part 42 of the guide element 34 which is not arranged in the recess 37 does not protrude.

The figure shows the screw system 3*a* in a screwed-in fastening position. The distance between the sleeve element 33 and the head 60*a* of the pin 32 is a fastening distance at which the object to be fastened, in FIG. 1 the adapter element 6, is placed. The spring element 40 is tightened.

To release the pin 32, the pin 32 is pushed downwards in the direction of the spring element 40 and rotated 180° around the pin axis A until the guide element 34 is positioned at the upper end 45*a* of the guide 44.

FIG. 4 shows a perspective view of a first embodiment of a sleeve element 33. The sleeve element 33 essentially comprises a sleeve 51 with a round cross-section having an upper side 52 with a large opening 55 and a lower side 56 with a small opening (cf. FIG. 3). The sleeve 51 comprises a flattened side 50 and a recess 49. The flattened side 50 serves to prevent rotation of the sleeve element 33. The sleeve element 33 is arranged in a recess of, for example, a connecting element 2 (cf. FIG. 1). A fastening pin 31 is then arranged in the recess 49 to fix the sleeve element 33 (not shown). The recess 49 is arranged at a transition from the flattened side 50 to the round side 54 and leads downwards from the upper side 52 by 7.7 mm.

The sleeve element 33 further comprises the guide 44. The guide 44 comprises a passage from the outer side of the sleeve 51 to the inner side of the sleeve 51. The guide 44 comprises two ends 45*a* and 45*b*, the first, upper end 45*a* being arranged 0.75 mm with a tolerance of +/−0.05 mm from the upper side 52 of the sleeve element 33 and the second, lower end 45*b* being arranged 2.6 mm with a tolerance of +/−0.5 mm. An engagement element 53, in this case a recess, is arranged at the lower end 45*b*.

Further, at the ends 45*a* and 45*b*, the guide 44 comprises two sections 46*a* and 46*b* without a pitch. A section with a pitch 48 is arranged between these sections 46*a* and 46*b*.

The sleeve element 33 is made of chromium-nickel steel.

Figure 5:
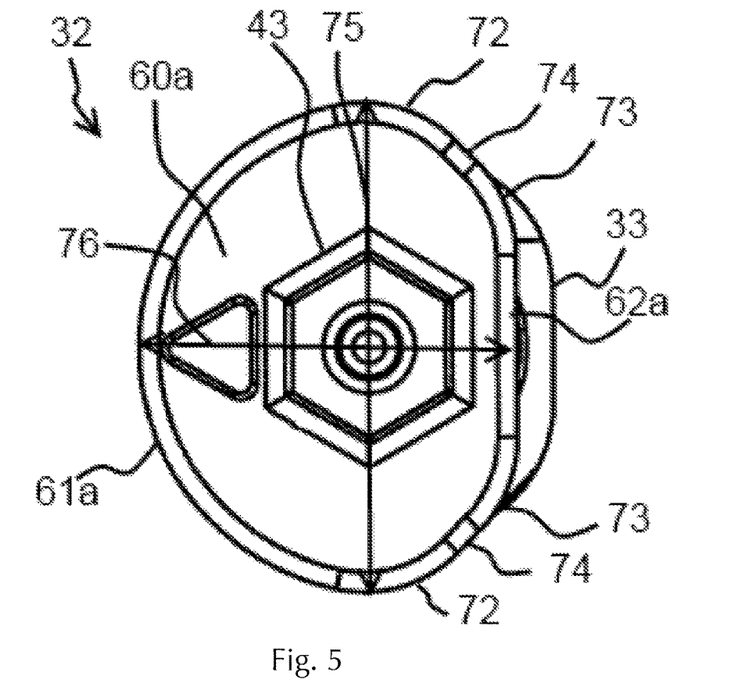
FIG. 5: Top view of a pin

FIG. 5 shows the screw system 3*a* from above. The pin 32 with head 60*a* can be seen, in which the recess 43 for inserting a hexagonal screwdriver is arranged. In cross-section, the head 60*a* comprises a round side 61*a* and a flat side 62*a*. The round side 61*a* comprises a radius of 3.75 mm with a tolerance of +/−0.05 mm. Three transition sections 72, 73, 74 are arranged at each of the transitions from the round side 61*a* to the flat side 62*a*. From the round side 61*a* to the flat side 62*a* follows the first transition section 72, which comprises a rounding with a radius of 2 mm. The second transition section 74 following in the same direction is straight with an inclination of 45° to the straight side 62*a*. The third, following transition section 73 again comprises a rounding of 2 mm.

At its widest point 75, the head 60*a* comprises a cross-sectional diameter of 7.45 mm. Transversely to this widest cross-sectional diameter, the head 60*a* comprises a cross-sectional diameter of 5.7 mm.

Also shown is the top surface of the sleeve element 33.

Figure 6:
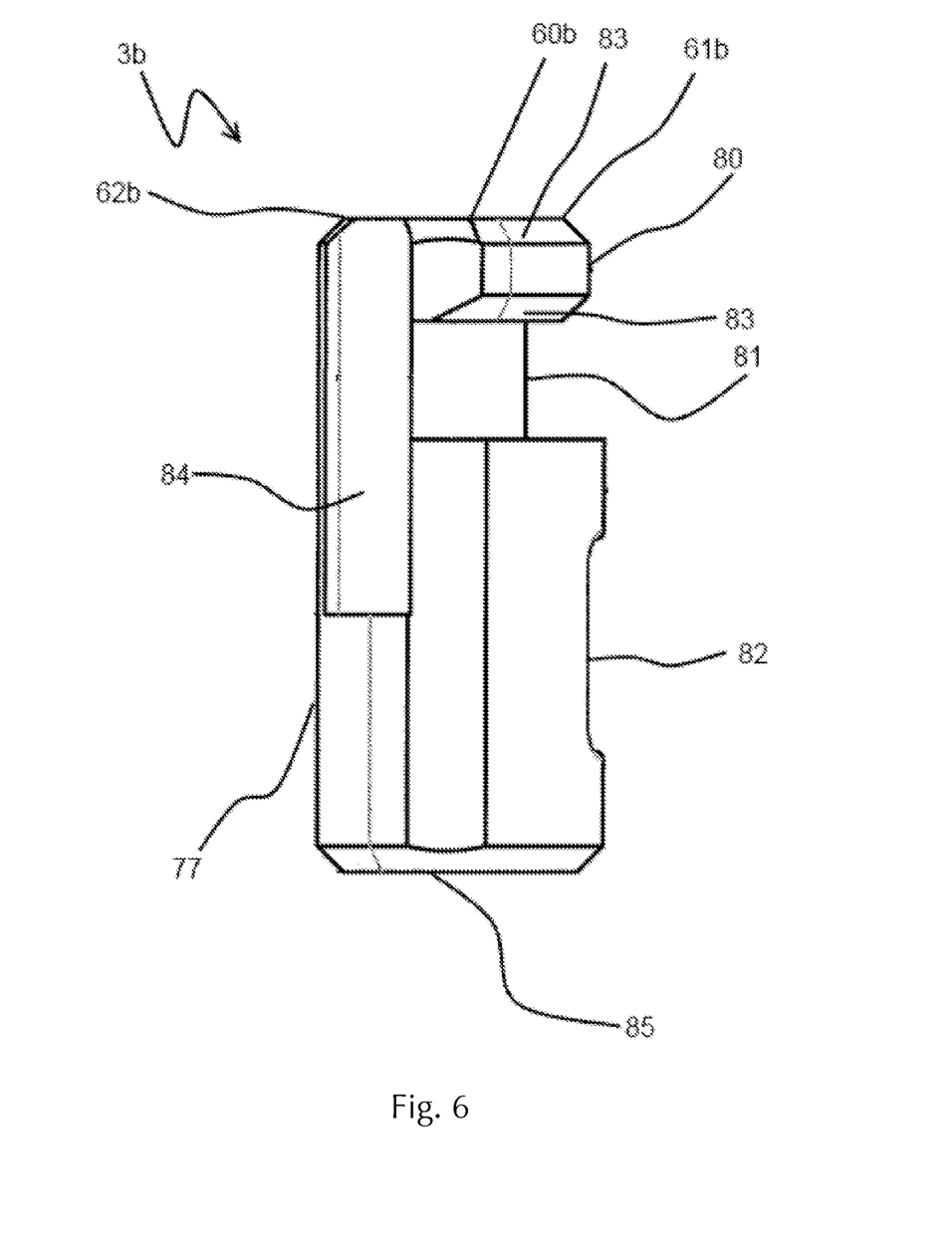
FIG. 6: Perspective view of a clamping element

FIG. 6 shows a clamping element 3*b* in a side view. The clamping element 3*b* is substantially 12.7 mm high. The clamping element 3*b* comprises a clamping head 60*b* with a projection 80 on the round side 61*b* (see also FIG. 7). The projection 80 has a height of 2 mm. Below the projection 80 is a clamping recess 81 in which the base plate 21 can be placed (cf. FIG. 1). The height of the clamping recess 81 is 2.3 mm. The projection 80 comprises bevelled edges 83 towards the top of the clamping element 3*b* and towards the recess 81. A clamping body 77 of the clamping element 3*b* is arranged below the clamping recess 81.

Two further cut-outs 82 and 84 are arranged on the sides of the clamping body 77. The cut-out 84 is designed to be connected to the fastening element 31 (cf. FIG. 1) and extends from a point 5 mm away from a lower side 85 of the clamping body 77 to an upper side 70 of the clamping head 60*b*. The cut-out 84 is 7.7 mm long. The cutout 82 is 4 mm long and begins at a location 2.4 mm from the underside 85 of the clamp body 77.

Figure 7:
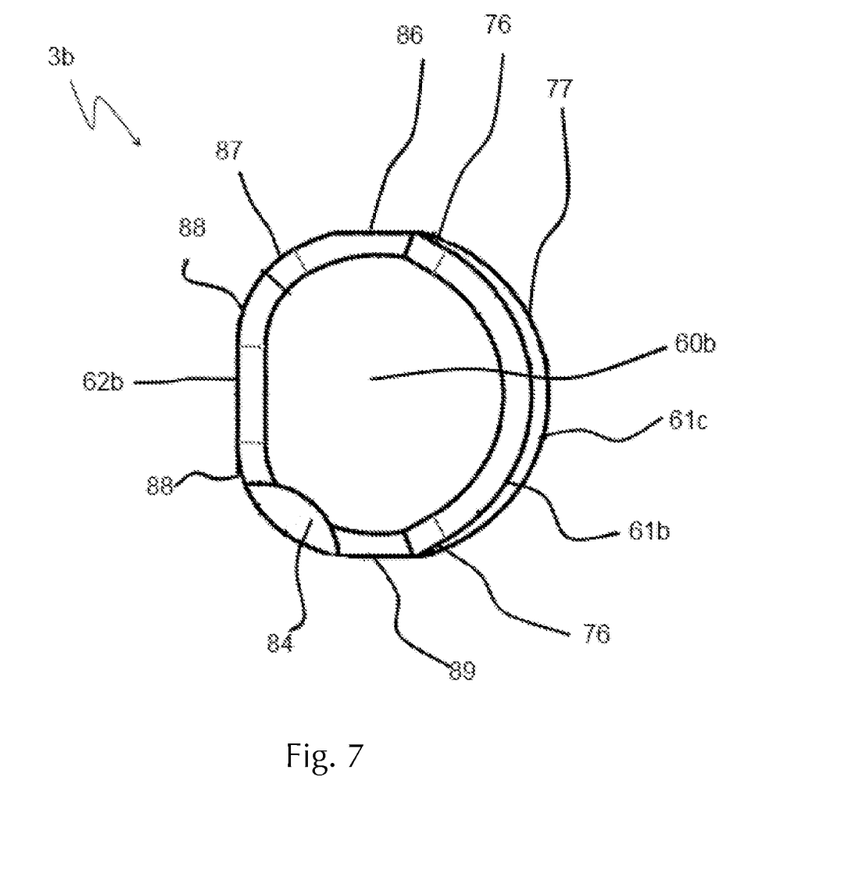
FIG. 7: Top view of the clamping element

FIG. 7 shows the clamping member 3*b* in a top view. In cross-section, the clamping head 60*b* has a round side 61*b* and a straight side 62*b*. The round side 61*b* has a radius of 2.7 mm. At one of the transitions from the round side 61*b* to the straight side 62*b* are three transition sections 76, 89 and 88 and the cutout 84. From the round side 61*b*, the straight transition section 76 follows first in a clockwise direction, followed by the straight transition section 89, the cut-out 84 and finally the rounded transition section 88.

From the round side 61*b*, the straight transition section 76 is the first to follow in a counterclockwise direction, followed by the kinked transition section 86, the rounded transition section 87 and finally the rounded transition section 88.

The cross-sectional diameter from the transition section 86 to the transition section 89 is 5.8 mm long. The cross-sectional diameter from the straight side 62*b* to the furthest point of the round side 61*b* is 5.5 mm.

The clamp body 77 comprises substantially the same cross-section. However, the round side 61*c* of the sprag cross-section comprises a radius of 3 mm with a tolerance of +/−0.05 mm. The round side 61*c* merges directly into the transition sections 86 and 89.

Figure 8:
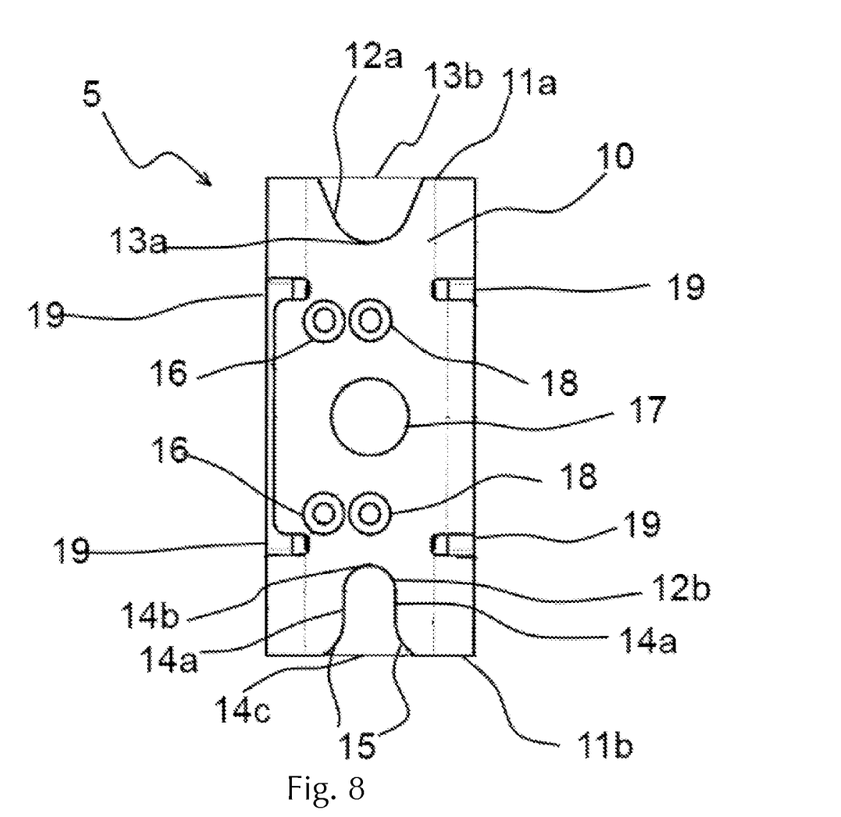
FIG. 8: Bottom view of an adapter element

FIG. 8 shows a bottom view of the adapter element 6. The bottom side 10 of the adapter element 6 with a rectangular base can be seen. A fastening opening 12*a* is arranged at the narrow end 11*a* of the base surface. The attachment aperture 12*a* comprises a substantially triangular shape, the inner tip 13*a* being rounded with a radius of 3.05 mm. The side 13*b* opposite the tip 13 is open so that the fastening opening 12*a* can communicate with the clamping element 3*b* (cf. FIG. 1).

A fastening opening 12*b* is arranged at the further narrow end 11*b* of the base. The fastening opening 12*b* essentially comprises an elongated hole, i.e. two parallel sides 14*a* with here an end rounding 14*b*. The side 14*c* opposite the end rounding 14*b* is open so that the fastening opening 12*b* can communicate with the screw system 3*a* (cf. FIG. 1). The edges 15 of the open side 14*c* are rounded with a radius of 3 mm.

In the centre of the underside 10 an air duct 17 is arranged which can be connected to an air delivery system for the nozzle (cf. FIG. 1). The air duct 17 has a cross-sectional diameter of 6 mm.

Furthermore, the adapter element 6 comprises two connection openings 16 for connecting to the nozzle 4 (cf. FIG. 1). These connecting openings 16 are designed as countersunk holes with an outer cross-sectional diameter of 3.2 mm and an inner cross-sectional diameter of 1.6 mm with a tolerance of H8.

Furthermore, the adapter element 6 comprises countersunk holes 18 on the underside 10. These countersunk holes 18 are used to attach a nozzle element of a different type (not shown here).

In this embodiment, the adapter element 6 is manufactured in one piece with the protective element 5 as a stamped part. Therefore, the punched openings 19 can be seen here on the underside 10.

Figure 9:
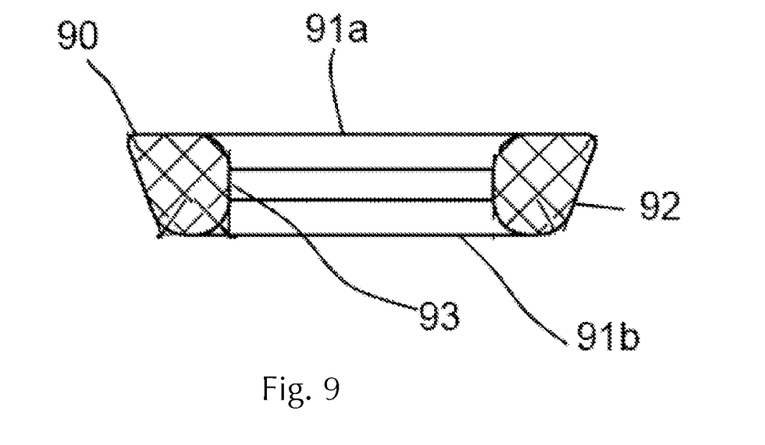
FIG. 9: Cross-section through a seal

FIG. 9 shows a cross-section of a seal 90. The seal 90 is substantially conical with bevelled outer side walls 92 and straight inner side walls 93. The inner cross-sectional diameter is 6 mm. On the wide side 91*a*, the outer cross-sectional diameter is 10.8 mm with a tolerance of +/−0.15 mm. On the narrow side 91*b* the outer cross section diameter is 9.126 mm with a tolerance of +/−0.15 mm. The seal 90 is 2.3 mm high with a tolerance of +/−0.1 mm. The seal 90 is made of fluorocarbon rubber.

Figure 10:
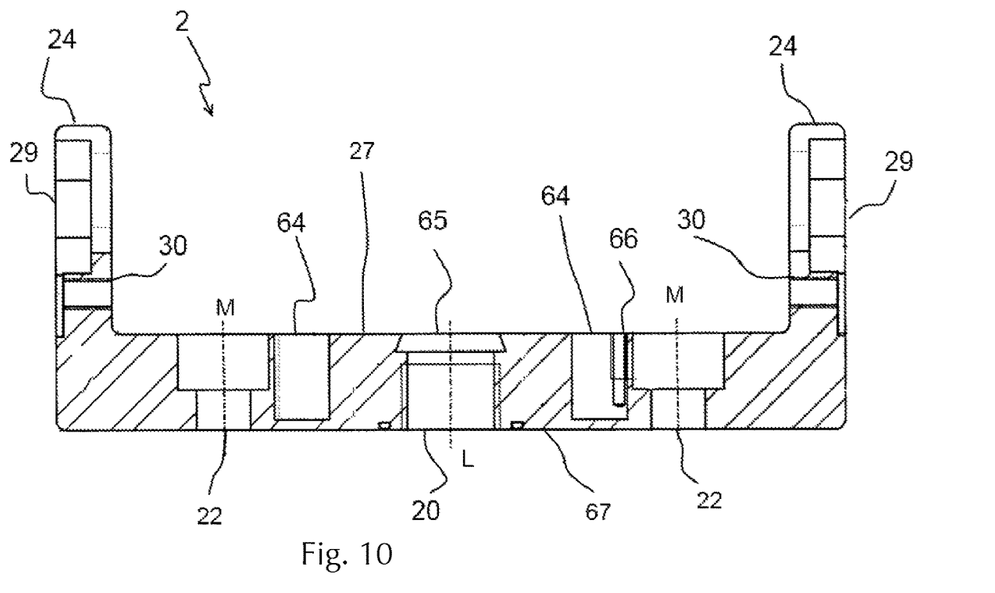
FIG. 10: Cross-section through a connecting element

FIG. 10 shows a cross-section of the connecting element 2. The yarn guiding elements 24 arranged on the side can be seen, each of which comprises a recess 29 for receiving a yarn protection element 25 (cf. FIG. 1).

Below the recesses 29 are the openings 30, into which screws can be inserted for fastening the yarn protection elements 25 (cf. FIG. 1).

A central axis L of an air channel 20 is arranged in the middle of the connecting element 2. The air channel 29 comprises a thread for connection to a compressed air connection. The thread of the air channel 20 leads from a lower side 67 of the connecting element 2 6.5 mm in the direction of an upper side 27 of the connecting element 2. Adjacent to the air channel 20 is a conically shaped extension 65 in which the seal 90 can be arranged, with the wide side 91*a* resting against the end of the air channel 20 (cf. FIG. 9).

The holes 22 are counterbored holes, each having a large cross-sectional diameter of 9 mm with a tolerance of +/−0.1 mm and a small cross-sectional diameter of 5.3 mm. The central axis M of the holes 22 are 45 mm apart.

A quick-fit aperture 64 is located between each of the holes 22 and the air duct 20. The quick fastening openings 64 lead 8.5 mm from the upper side 27 of the connecting element 2 towards the lower side 67 of the connecting element 2. The quick fastening system 3 is arranged in the quick fastening openings 64 (cf. FIG. 1). The quick-fix openings 64 have essentially the same cross-section as the clamping body 77 and the sleeve element 33.

In addition, a fastening aperture 66 is arranged adjacent to each quick fastening aperture 64 (only one shown here). The fastening aperture 66 extends 7 mm from the top surface 27 of the connecting element 2 towards the bottom surface 67 and comprises a thread, with part of the circumference of the fastening aperture 66 being open to the quick fastening aperture 64. A fastening element 31 is arranged in each fastening opening 66, thus connecting the screw system 3*a* and the clamping element 2*b* to the connecting element 2 (cf. FIG. 2). In another embodiment, this fastening opening is only 1.6 mm deep with a tolerance of +/−0.05 mm and closed at the circumference (not shown here). The advantage of this embodiment is that there are no burrs in the quick-fix opening 64.

Figure 11:
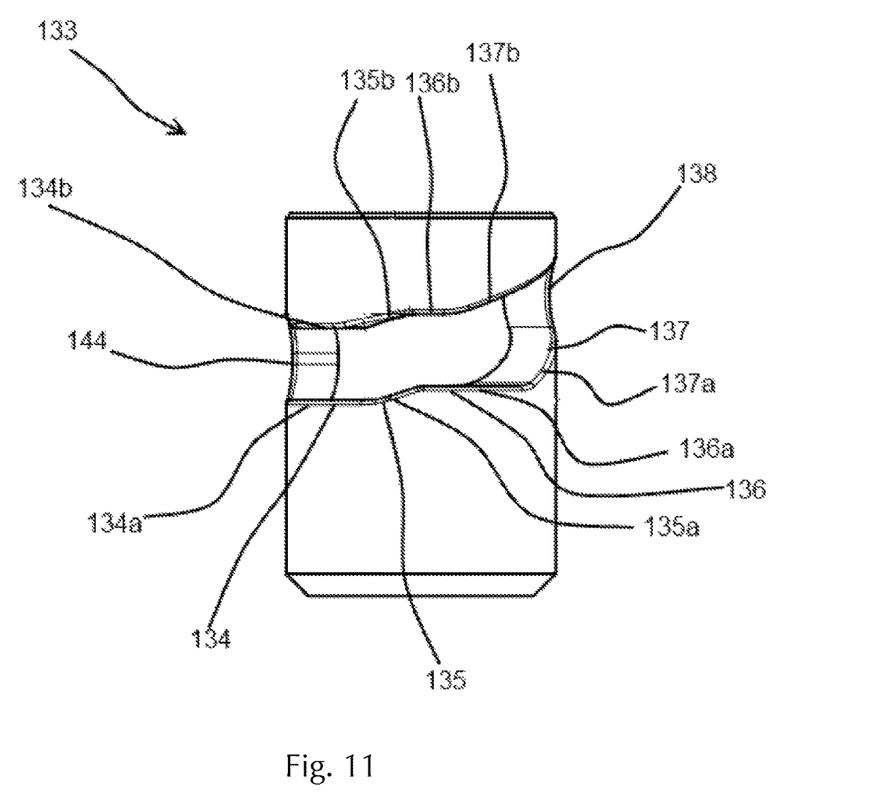
FIG. 11: First side view of a second embodiment of a sleeve element

FIG. 11 shows a second embodiment of a sleeve element 133 in side view. Only the differences to the first embodiment of the sleeve element 33 are described here.

The sleeve element 133 comprises a guide 144 having a first straight section 134, a second section 135 having a pitch, a third straight section 136 and a fourth section 137 having a pitch. The second section 135 comprises a pitch of 18°, overcoming a height of 0.315 mm with a tolerance+/− 0.05. The lower sidewall 134*a* is longer than the upper sidewall 134*b*. Similarly, the lower sidewall 136*a* is longer than the upper sidewall 136*b*. The second section 135 also has an upper sidewall 135*b* and a lower sidewall 135*a*. The fourth section further has an upper sidewall 137*b* and a lower sidewall 137*a*. These sidewalls 135*b*, 135*a* of the second section 135 and these sidewall of the fourth section 137 have a pitch with respect to the third straight section 136.

The transitions between the sections 134, 135, 136 and 137 are rounded with radii between 0.5 and 2 mm, which allows easy guiding of the guide element 34 (cf. FIG. 3).

Figure 12:
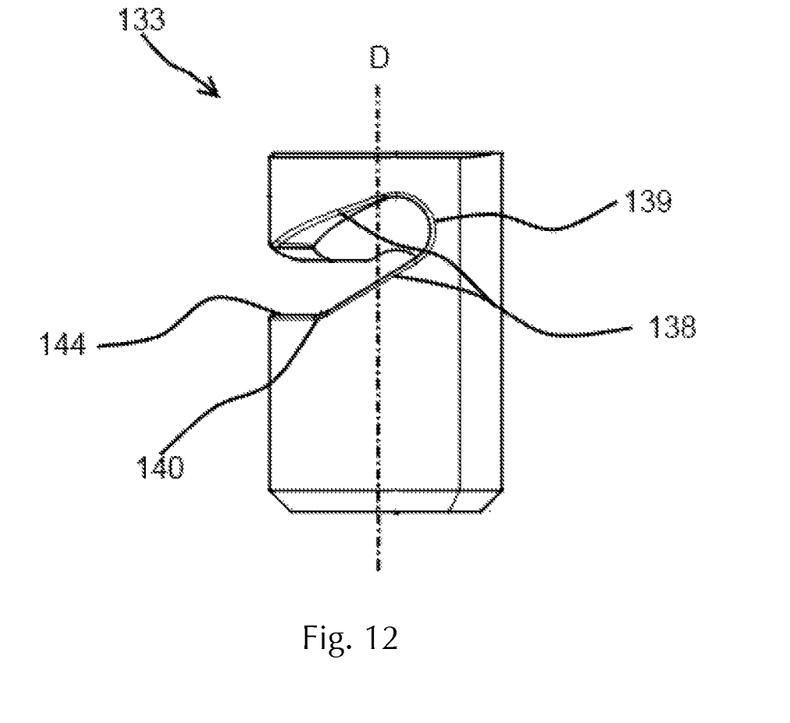
FIG. 12: Second side view of a second embodiment of a sleeve element

FIG. 12 shows another side view of the second embodiment of the sleeve element 133.

The section 138 of the guide 144 does not comprise a straight section but a slope, the end 139 being rounded. The section 138 comprises a height parallel to the axis of rotation D of 2.8 mm. The lower side 140 comprises a transition 140 with a radius of 0.5 mm.

Figure 13:
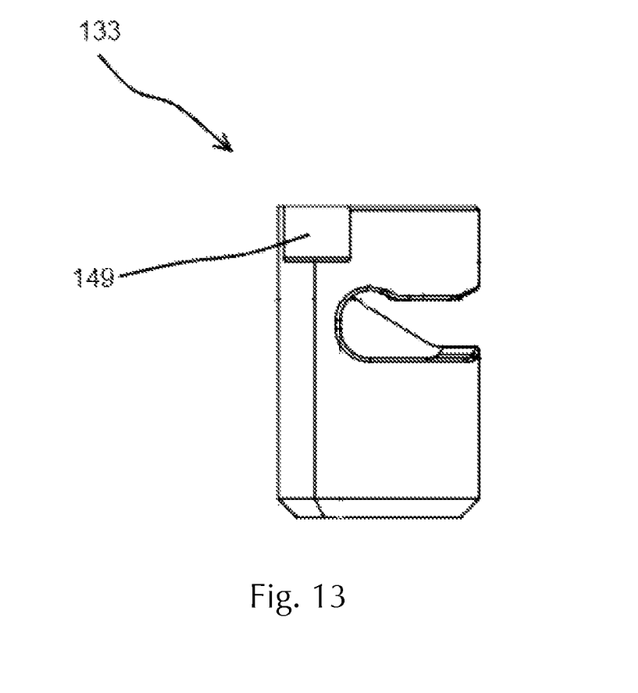
FIG. 13: Third side view of a second embodiment of a sleeve element

FIG. 13 shows a third side view of the second embodiment of the sleeve element 133. Here, the sleeve element 133 also comprises a notch 149. In this embodiment, the incision 149 is 1.5 mm high and has a radius of 1.85 mm with a tolerance of +/−0.05 mm. The recess 149 is used to position the head of a screw so that it presses on the lower surface of the recess 149.

The invention claimed is:

1. A nozzle system for a textile machine, comprising at least one nozzle element and a connecting element for connecting the nozzle element to the textile machine, wherein the connecting element comprises at least one quick fastening system, wherein the quick fastening system comprises a first position and a second position, wherein in the first position the quick fastening system is connected to the connecting element so that the nozzle element can be fastened to the quick fastening system in such a way that the nozzle element can be removed without auxiliary devices, wherein the quick fastening system is designed in such a way that in the second position the nozzle element is immovably fastened to the connecting element.

2. The nozzle system according to claim 1, wherein the quick fastening system is designed such that in a fastening position of the connecting element the nozzle element can be prevented from falling down.

3. The nozzle system according to claim 1, wherein in the first position of the quick fastening system the nozzle element is movable between the first position and the second position.

4. The nozzle system according to claim 1, wherein the at least one nozzle element comprises an adapter element, wherein at least one nozzle is arranged on the adapter element.

5. The nozzle system according to claim 4, wherein the at least one nozzle is fastened or fastenable directly or via an intermediate adapter element to the adapter element and/or the adapter element to the connecting element by the quick fastening system.

6. The nozzle system according to claim 5, wherein the nozzle element comprises at least one protective element for protecting the nozzle.

7. The nozzle system according to claim 6, wherein the protective element comprises an impact cage.

8. The nozzle system according to claim 1, wherein the connecting element comprises a seal for sealing an air delivery system.

9. The nozzle system according to claim 8, wherein the seal comprises a substantially conical shape.

10. The nozzle system according to claim 9, wherein an inner surface of the seal comprises a radius which is constant towards the axis of the seal.

11. The nozzle system according to claim 1, wherein the connecting element comprises at least one recess for receiving a sleeve element of the quick-fastening system.

12. The nozzle system according to claim 1, wherein the quick fastening system comprises at least one screw system wherein the screw system comprises a sleeve element for fastening to a first element and a pin for connecting to a second element, wherein the pin comprises at least one circumferentially arranged guide element, wherein the sleeve element comprises a guide for guiding the guide element, wherein the pin is arranged at least partially within the sleeve element so that the pin is rotatably and displaceably mounted relative to the sleeve element, and wherein the guide comprises a maximum of ¾ turn, in particular a maximum of ½ of a turn.

13. The nozzle system according to claim 12, wherein the screw system is designed to be changeable from the first position to the second position by turning an element of the screw system by less than 181°.

14. The nozzle system according to claim 12, wherein the quick fastening system comprises a clamping element.

15. A textile machine comprising at least one nozzle system according to claim 1.

* * * * *